UNITED STATES PATENT OFFICE.

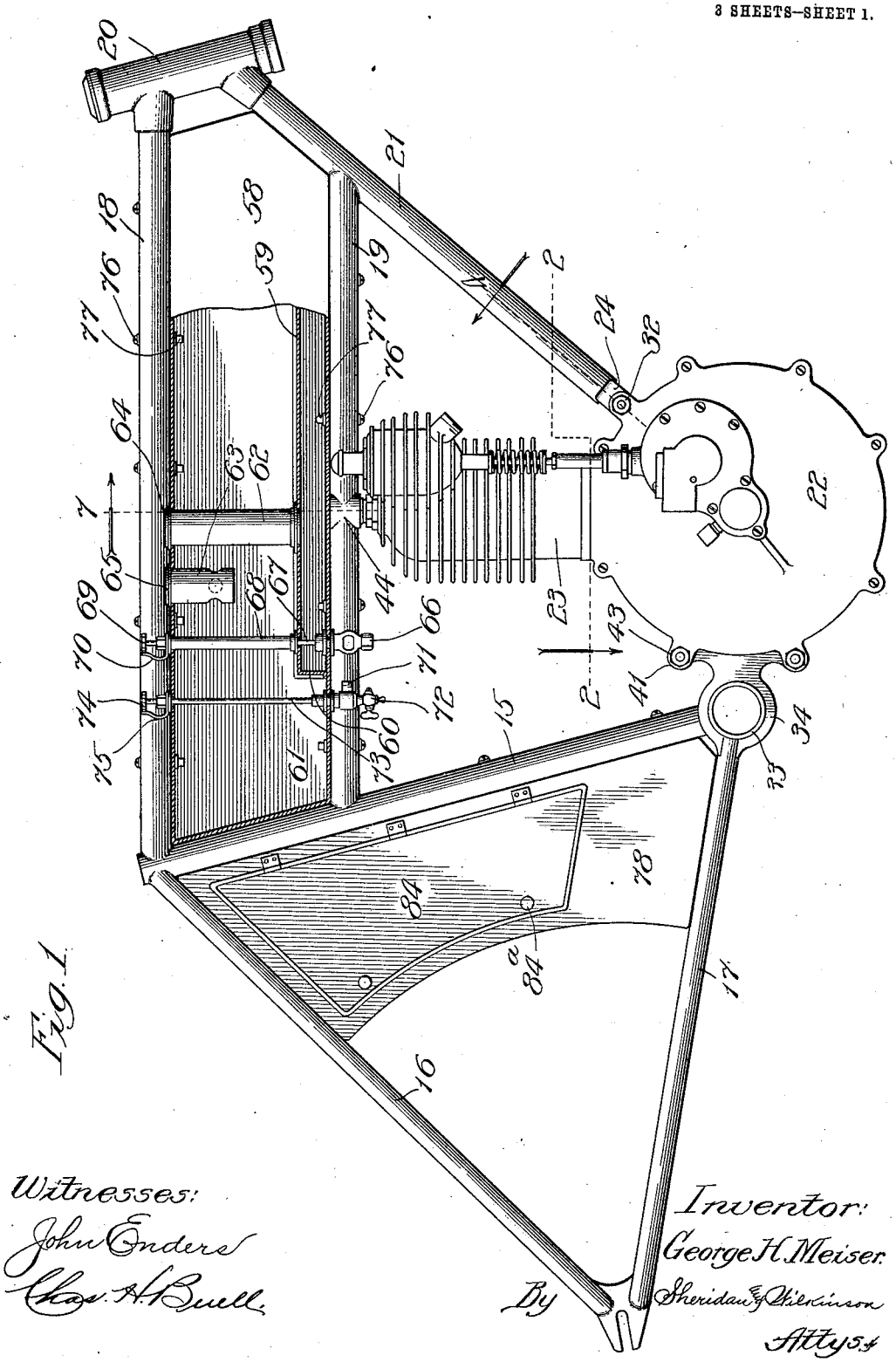

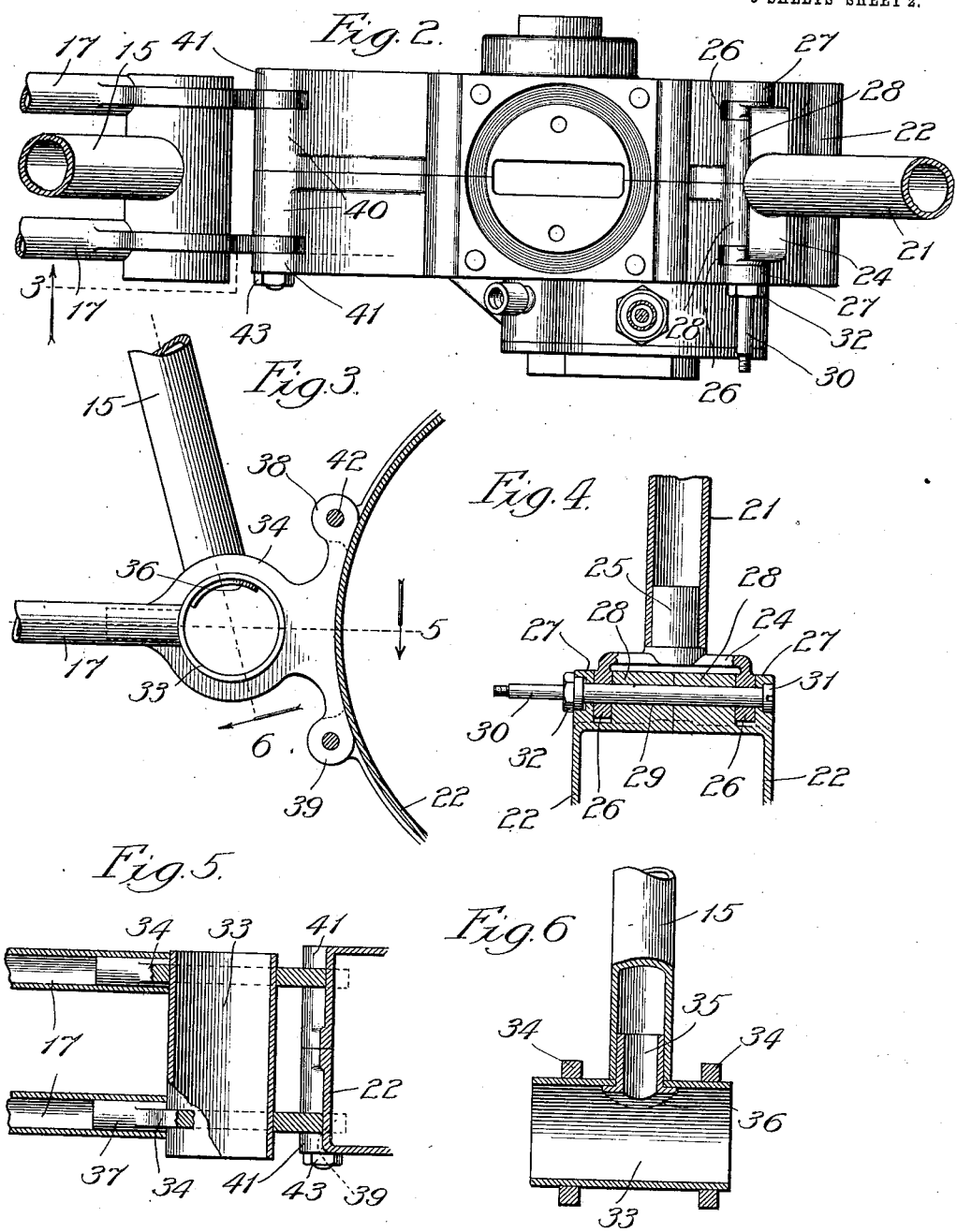

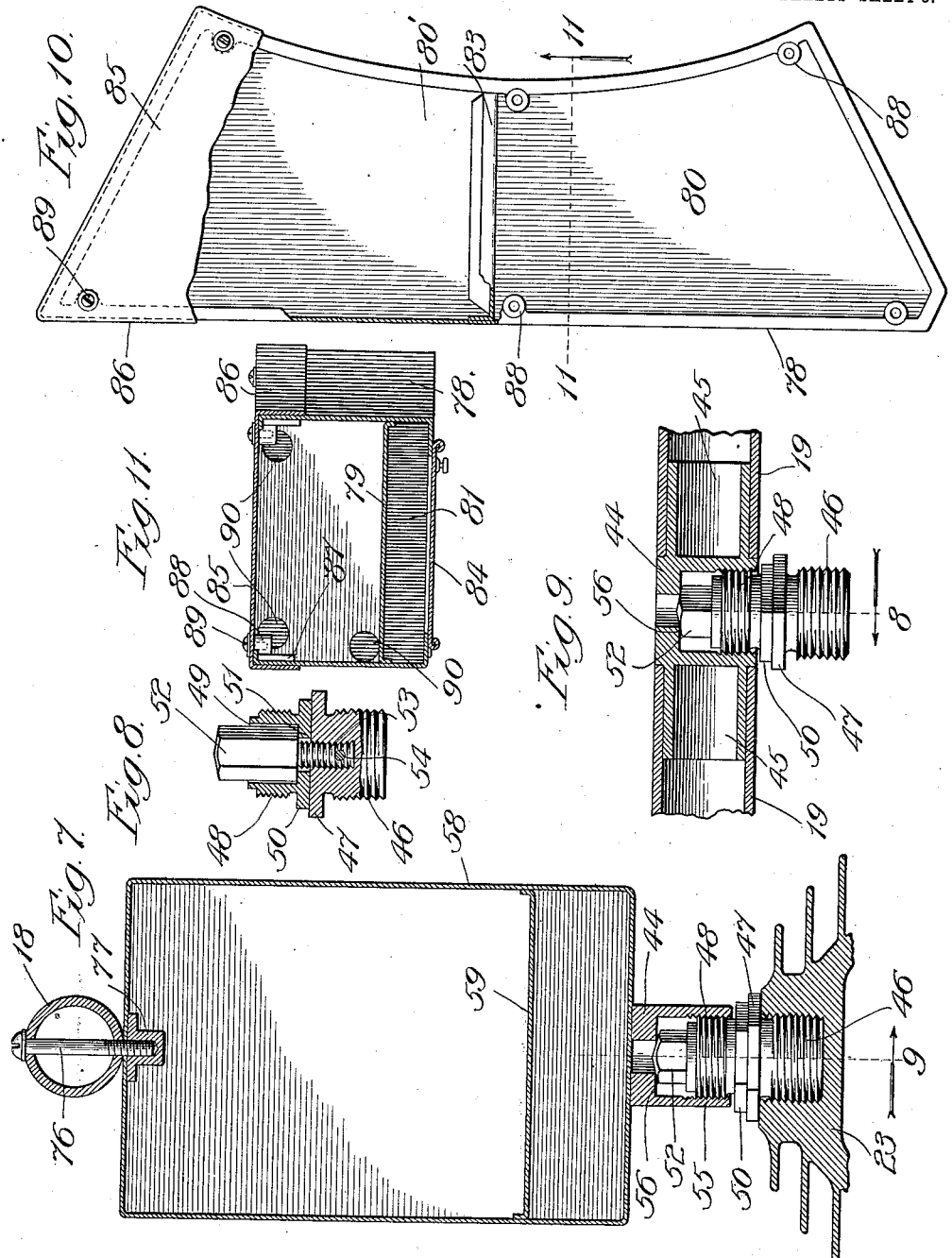

GEORGE H. MEISER, OF CHICAGO, ILLINOIS, ASSIGNOR TO EXCELSIOR SUPPLY COMPANY, A CORPORATION OF ILLINOIS.

MOTOR-CYCLE FRAME.

1,084,654. Specification of Letters Patent. Patented Jan. 20, 1914.

Application filed April 21, 1908. Serial No. 428,358.

*To all whom it may concern:*

Be it known that I, GEORGE H. MEISER, a citizen of the United States, residing at Chicago, in the county of Cook and State of Illinois, have invented certain new and useful Improvements in Motor - Cycle Frames, of which the following is a specification.

The object of my invention is to provide a new and improved frame for a motorcycle.

Other objects in detail in connection therewith are to provide a motorcycle frame of which the engine casing shall be an element, to so arrange the frame as to advantageously utilize available space for the oil tanks and also to arrange properly for other elements.

All these objects and others will be made apparent in the following specification and claims, taken in connection with the accompanying drawings, in which—

Figure 1 is a side elevation of the frame, certain parts being shown in section for greater clearness. Fig. 2 is a section taken on the line 2, 2 of Fig. 1. Fig. 3 is a section taken on the line 3 of Fig. 2. Fig. 4 is a section taken on the line 4 of Fig. 1. Fig. 5 is a section taken on the line 5 of Fig. 3. Fig. 6 is a section taken on the line 6 of Fig. 3. Fig. 7 is a section taken on the line 7 of Fig. 1. Fig. 8 is a section of certain elements shown at the bottom part of Fig. 7. Fig. 9 is a section on the line 9 of Fig. 7. Fig. 10 is an elevation of the chamber shown at the left of Fig. 1, but this view being taken from the opposite side and the cover being shown broken away for the sake of greater clearness. Fig. 11 is a section on the line 11, 11 of Fig. 10.

The motor-cycle frame comprises an upward, rearward sloping tubular member 15 from the ends of which the tubular members 16 and 17 extend on each side of the rear wheel uniting at the rear wheel axle, all this being familiar to those skilled in the art. From the top end of the member 15 the horizontal tubular member 18 extends forward, meeting the steering-head 20 at the front end of the frame. Below the member 18 and parallel therewith is another tubular member 19 which connects from the upright 15 to the member 21, the latter sloping upwardly and forwardly to the steering-head 20. The crank casing of the engine is designated by the reference numeral 22. Rigidly attached to it on the upper side is the engine cylinder 23. A yoke 24 has a main part 25 brazed to the lower end of the tube 21 (see Fig. 4). The two branches 26 of the yoke are perforated and register with holes in the lugs 27 and 28 that project out from the crank casing 22. Through all these registering holes there passes a bolt 29 having its head 31 countersunk on one side. A projection 30 extends out from the other end of the bolt, this being intended to form a pivotal support for certain controlling mechanism, which need not be further discussed here as it forms no part of my invention. The parts are clamped together by means of the nut 32 upon the bolt 29.

Referring to Figs. 3, 5 and 6 I will now describe how the crank casing 22 and the tubular members 15 and 17 are attached together. A short transverse cylinder 33 to support the pedal shaft bearings is provided having a pair of circumferential ribs 34. A hole on one side of this cylinder registers with the end of the tube 15 and a thimble 35 with a flange 36 is brazed to both members so as to secure them together. On the rear side each of the ribs 34 merges into a projection 37, which goes within the respective tubes 17 and is brazed thereto. On the forward side each rib 34 branches out, the branches terminating in perforated lugs 38 and 39. It will be seen that the branches comprising the two perforated lugs 38 and 39 constitute T-head projections from the cylinder 23. The lugs 40 and 41 on the crank casing have perforations that register with those in the aforesaid lugs 38 and 39 and a bolt 42 with a co-acting nut 43 clamps the parts together.

The horizontal frame member 19 is interrupted at an intermediate point, the opposing ends thereof being brazed to the projecting parts 45 of the socket member 44, as shown in Fig. 9. For the purpose of securing the head of the cylinder 23 to this socket member 44 the composite nut 46—48—52 is provided. This may be described as consisting of two nuts 46 and 48 swiveled together. The member 46 is externally screw-threaded and has a flange 47 adapted to receive a wrench. The member 48 is also screw-threaded and has a flange 50 adapted to receive a wrench. These two members are placed together, as shown in Fig. 8. The member 48 has an inner flange 51 surrounding an opening and through this opening the screw-threaded member 53 projects into a correspondingly screw-threaded seat in the member 46. A rivet 54 secures the parts 46 and 52 in fixed relation, leaving the part 48 free to rotate relatively to them, but not capable of displacement otherwise. The purpose of this arrangement will be understood best by looking at Fig. 7 where it will be seen that after screwing the member 46 tightly into the head of the cylinder 23 by means of its flange 47 then the externally screw-threaded member 48 can be screwed up into the correspondingly internally screw-threaded socket 55, by means of the flange 50, until the head 52 abuts tightly against the bottom 56 of the said socket.

The oil tank 58 lies between the parallel horizontal tubular frame members 18 and 19. A horizontal partition 59 extends from the forward end nearly to the rear end and then bends down to the bottom, as indicated by the reference numeral 60, thus leaving a pocket 61 as a part of the upper compartment of the tank 58. The tube 62 with the top opening 64 is provided for supplying lubricating oil to the compartment below the partition 59, and the tube 63 with its top opening 65 are to fill gasolene into the compartment above the partition 59. The outlet 66 from the lubricating oil compartment is controlled by the valve wheel 69 on the valve stem 67, this being surrounded by a tubular sheath 68 where it passes through the gasolene compartment. A spring catch 70 is provided to prevent accidental rotation of the valve wheel 69. Similarly the outlet 71 from the gasolene compartment is controlled by the valve wheel 74 on the stem 73 and having a spring catch 75. 72 is a drainage cock for the gasolene compartment. Little nuts 77 (see Fig. 7) are soldered to the inside of the tank 58 and these co-act with screw-headed bolts 76 through holes in the tubular frame members 18 and 19, to secure the tank in place.

In the space back of the upright tubular frame member 15 between the same and the rear wheel the sheet metal box 78 is placed. This has a vertical longitudinal partition 79, shown in Fig. 11, the compartment on one side being designated as 81. On the other side there is a small horizontal partition 83 (see Fig. 10) which divides the space on that side into lower and upper compartments 80 and 80′. The long narrow compartment 81 on one side of the partition 79 may be reached through the outside hinged door 84, which may be locked by the latches 84ª. This compartment is intended to receive a tool-roll, that is, a set of tools wrapped up in some flexible material, as cloth, to prevent them from rattling. Compartments 80 and 80′ on the other side of the partition 79 may be reached through the cover 85, the nature of which will be best seen in Figs. 10 and 11. This has a flange 86 all around its periphery which engages the sheet-metal walls of the box 78. Little lugs 87 having screw-threaded parts 88 are soldered to the inner walls of the box 78, as shown in Figs. 10 and 11, and screws 89 through holes in the cover 85 serve to secure the said cover tightly in place. One of the chambers 80, 80′ is intended to receive the ignition batteries, and the other chamber is to receive the spark coil. The holes 90 in the partition 83 are to permit electrical connections to be made between the said batteries and coil.

It will be noted, especially on considering Fig. 1, that the engine comprising its crank casing is a component element of the motorcycle frame, that is, the engine is not merely supported by the frame, but it is a part of the frame. It has three points of attachment to the other frame elements, namely, at 24, 44 and 33. Thus it will be seen that it takes the same place in the frame as a triangular structure having its three vertices at the three points mentioned. Such a triangular structure in combination with the adjacent triangular structures formed by the tubes 19 and 21 on the one side and the tubes 19 and 15 on the other side would obviously be very strong and just as obviously the structure as it is, comprising the engine casing, has the same strength.

I desire to call attention to the advantageous way in which I have utilized the frame spaces for oil tanks and storage chambers. The pocket 61 in the gasolene compartment makes it possible to drain the last remnant of gasolene therefrom. The shallow depth of the lubricating oil compartment insures a practically constant pressure head for the lubricating oil on its way to the engine and thus the feed is practically constant for any given adjustment thereof. The space in front of the rear wheel has been advantageously utilized for the ignition batteries, the spark coil and the tool-roll. By putting these elements in this position instead of above the rear wheel, as has been somewhat customary, I have succeeded in lowering the center of gravity of the entire machine which is a decided advantage.

I claim:

1. In a motorcycle, a frame comprising a motor crank casing, a cylinder adapted to receive bearings for a pedal shaft, tubular frame members, projections from the cylinder into said frame members and T-head projections adapted to be bolted at their extremities to the casing.

2. In a motorcycle, a frame comprising parallel horizontal members, and a sheet metal tank between said members, said tank having a horizontal partition extending nearly its whole length and bent down at the end to form a pocket in the upper compartment.

3. In a motorcycle, a frame comprising an upright member in front of the rear wheel of the motor cycle, and a sheet metal box filling the space between said member and said wheel, said box having a vertical longitudinal partition therein and openings on the sides to the respective compartments.

4. In a motorcycle, a frame comprising a horizontal tubular member, an engine casing, and means for attaching the cylinder head of the engine casing to the tubular member, said means consisting of screw-threaded sockets in the tubular member and in the engine, and opposed nuts swiveled together and adapted to engage the respective sockets.

5. In a motorcycle, a frame comprising a longitudinal horizontal top member, and a sheet metal tank attached directly beneath said frame member and extending in the direction of the length of the motorcycle, said tank having a horizontal partition extending from one end wall to a point near the other end wall and being bent down to the bottom wall at said point so as to form a pocket in the upper compartment.

6. In a motorcycle, a frame comprising a tubular member, an engine casing, and means attaching the cylindrical head of the engine casing to the tubular member, said means consisting of a reinforcing piece within the tubular member, said reinforcing piece having a screw threaded socket directed toward the engine casing, said engine casing having an opposed screw threaded socket and a pair of nuts having their opposed ends swiveled together and adapted to engage the respective sockets.

In testimony whereof, I have subscribed my name.

GEORGE H. MEISER.

Witnesses:
LILLIAN A. KIBBY,
ANNIE C. COURTENAY.

---

Copies of this patent may be obtained for five cents each, by addressing the "Commissioner of Patents, Washington, D. C."